US012641526B2

(12) United States Patent
Sheikh et al.

(10) Patent No.: US 12,641,526 B2
(45) Date of Patent: May 26, 2026

(54) ADAPTIVE CELL SEARCH

(71) Applicant: Apple Inc., Cupertino, CA (US)

(72) Inventors: Parvez Sheikh, Bengaluru (IN); Bernd H Kemmer, Eichenau (DE); Priti Kumari, Bangalore (IN)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 18/477,980

(22) Filed: Sep. 29, 2023

(65) Prior Publication Data

US 2025/0113289 A1    Apr. 3, 2025

(51) Int. Cl.
H04W 48/16      (2009.01)
H04W 84/12      (2009.01)

(52) U.S. Cl.
CPC ............ H04W 48/16 (2013.01); H04W 84/12 (2013.01)

(58) Field of Classification Search
CPC ..... H04W 48/16; H04W 48/18; H04W 48/20; H04W 8/005; H04W 84/12; H04J 11/0069
USPC ......... 370/328; 455/160.1–161.1, 434–435.3
See application file for complete search history.

(56) References Cited

U.S. PATENT DOCUMENTS

| | | | |
|---|---|---|---|
| 9,380,557 B2 | 6/2016 | Cili et al. | |
| 11,490,302 B2 | 11/2022 | Matolia et al. | |
| 11,490,306 B2 | 11/2022 | Venkataraman et al. | |
| 2013/0344902 A1 * | 12/2013 | Cili ...................... | H04W 48/16 455/456.6 |
| 2016/0309400 A1 | 10/2016 | Swaminathan et al. | |
| 2018/0063751 A1 * | 3/2018 | Shi ......................... | H04W 36/36 |
| 2020/0107291 A1 * | 4/2020 | Nayak ................... | H04W 8/183 |
| 2023/0078257 A1 | 3/2023 | Venkataraman et al. | |

FOREIGN PATENT DOCUMENTS

WO         2013130052 A1     6/2013

* cited by examiner

*Primary Examiner* — Michael Y Mapa
(74) *Attorney, Agent, or Firm* — Eschweiler & Potashnik, LLC; Matthew Glause

(57)         ABSTRACT

Systems, methods, and circuitries are provided for performing adaptive cell searching. In one example, a method for a user equipment (UE) includes determining that the UE has entered an out of coverage (OOC) status and, in response, configuring a cell search pattern that defines a series of scheduled search instances for each of one or more frequency sets. A timing of the series of scheduled search instances is based on a time at which the UE entered OOC status and the cell search pattern is configured to cause performance of a respective minimum search rate of respective frequency sets. The frequency sets are searched based on the configured cell search pattern.

23 Claims, 8 Drawing Sheets

ADAPTIVE CELL SEARCH

BACKGROUND

The present disclosure relates generally to wireless communication and more specifically to techniques that may be used by a user equipment (UE) to search for a cellular network cell when the UE is out of coverage (OOC).

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

Figure 1:
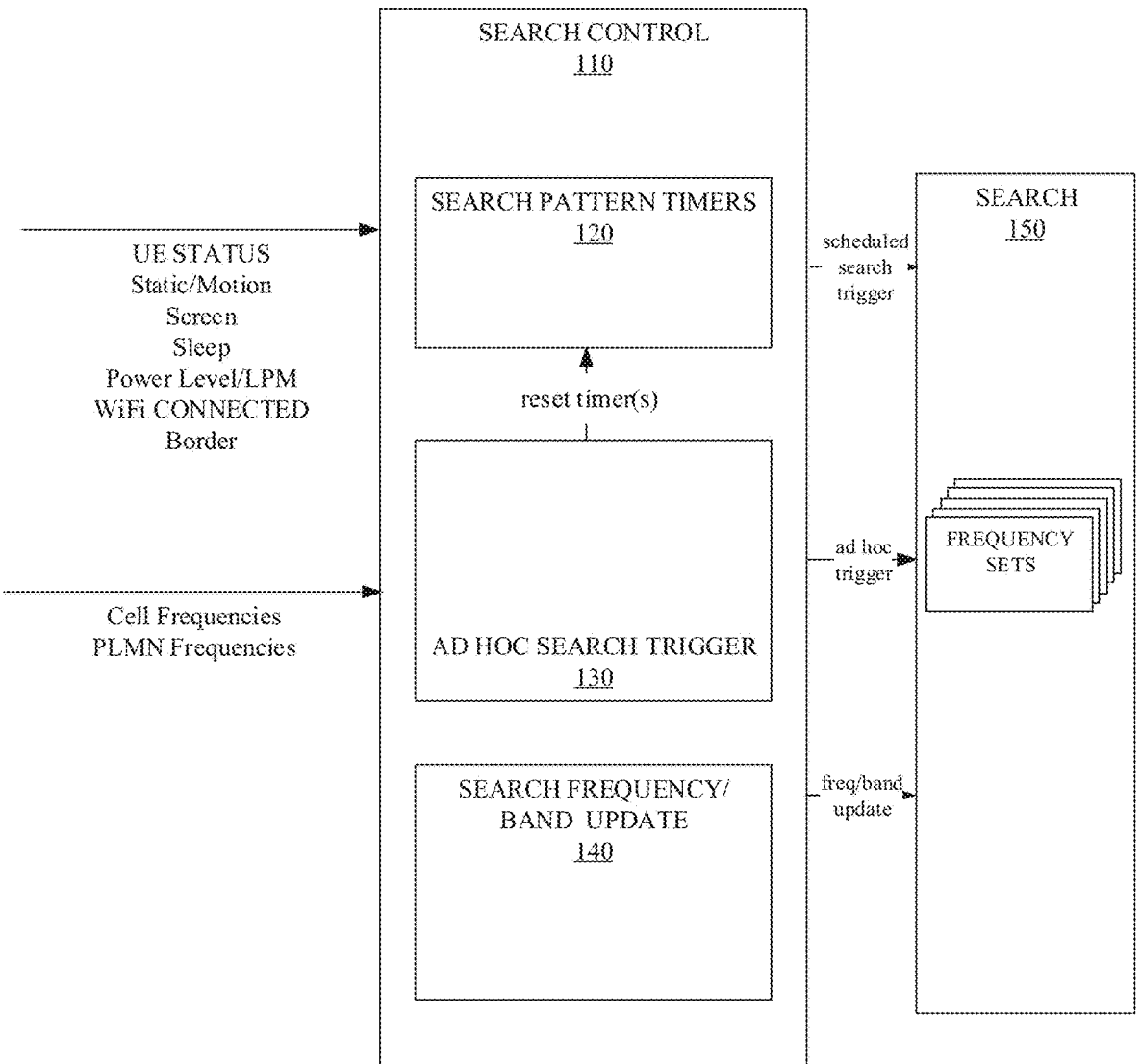
FIG. 1 is a diagram of an example search control circuitry of a UE, in accordance with various aspects described.

The present disclosure is described with reference to the attached figures. Similar components in various figures are represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Throughout the world, different radio access technologies (RATs) (e.g., LTE, 5G NR, and so on) are deployed across multiple bands on a per RAT basis, with the bands associated with the different RATs varying based on country and region. With the introduction of 5G NR, there may be four RATs (2G/3G/4G/5G) available for searching and each RAT has multiple supported frequencies and frequency bands. Further, for 5G NR, there are frequencies ranging from FR1 (below 6 GHZ) to FR2 (millimeter wave). This means that there is a large and ever increasing spectrum of frequencies and bands that an out of coverage (OOC) UE may search to find a cell. To conserve power, cell searches should be targeted to frequencies/bands and performed during time periods that are most likely to lead cell recovery.

When a UE is switched on, a public land mobile network (PLMN) may be selected by non-access stratum (NAS). The NAS may provide a list of other PLMNs and corresponding priorities, if available, that the access stratum (AS) may use for cell selection and reselection. One or more associated RAT may be set for each PLMN. The UE searches for a suitable cell of the selected PLMN and RAT. The UE chooses that cell to provide available services and will monitor the cell's control channel. This procedure may be referred to as "camping on the cell." The UE may, in some circumstances, then register its presence in the tracking area of the chosen cell. If the UE finds a more suitable cell, according to a cell reselection criteria, the UE may reselect that cell and camp on the cell. The UE may search for higher priority PLMNs at regular time intervals.

If the UE goes out-of-coverage (OOC) (also called out-of-service (QOS)), it may attempt to re-acquire service by executing a cell search algorithm. In the design of the cell search algorithm, a balance is struck between power usage and cell acquisition performance. In order to conserve power while executing the cell search algorithm, the UE may alternate between operating in a scanning state, which expends power but may result in service acquisition, and operating in a sleeping state, which conserves power but delays service acquisition.

Some cell search algorithms are divided into a stored list search (SLS), a derived band search (DBS), and a remaining band search (RBS). The SLS includes the most recently used frequencies, which are stored in a list by the UE. Due to the limited number of frequencies on the list, a SLS may have a significantly shorter duration than a DBS and may therefore be performed at a faster rate. An SLS may be useful for short OOC scenarios, however as the duration of OOC increases, the SLS has a reduced likelihood of success.

DBS is performed on bands that may be found in the last pre-empted area, which may be derived from the frequencies stored by the UE and searched in the SLS. For example, for each frequency in the SLS, the entire band that includes the frequency is searched in a DBS. A DBS-MCC (mobile country code) may be performed on bands that are mapped to MCCs for countries proximate the UE's location but were not searched in the DBS. The DBS or DBS-MCC may have a longer duration than the SLS.

RBS searches all remaining bands that have not been searched in DBS or DBS-MCC, which may include all bands of a particular RAT. RBS therefore use a significant amount of time and power, especially for 5G NR. RBS have a longer duration than DBS and may, in some examples, be performed on a fairly limited basis, such as every x DBS or when no suitable cell is found using SLS or DBS.

Some cell search algorithms make it difficult to determine the particular times (e.g., with respect to a time at which the UE loses coverage) at which DBS/RBS will be performed, leading to ambiguity in design considerations. Further, many search algorithms do not support ad hoc triggering of searches in response to UE-related trigger events or dynamically adapting frequencies and bands that are searched in SLS, DBS, or DBS-MCC.

Described herein are systems, architectures, and devices that support adaptive cell searches. A cell search pattern is provided that may be flexibly and dynamically configured for searching different sets of frequencies or bands at varying rates with respect to a time at which the UE lost coverage. The cell search pattern may be configured based on a power state of the UE. The cell search patterns may be divided into multiple time phases in which earlier time phases include more intensive searching of frequencies and bands that are related to a UE's past or present location while later time phases include less intensive searches over more comprehensive sets of bands. An ad hoc triggering mechanism is provided that may trigger an immediate search (e.g., not scheduled by the cell search pattern) in response to changes in UE operating status. Additionally, information from a database that maps operating frequencies to locations for UEs in coverage may be leveraged to trigger searches when a change in the UE's location is detected or to update frequency sets that will be searched based on frequencies and bands supported in a new location.

FIG. 1 illustrates an exemplary adaptive cell search system that includes search control circuitry 110 and search circuitry 150. In some aspects, search control circuitry 110 and search circuitry 150 are implemented by a baseband processor of a UE executing stored instructions. See FIG. 8 for a functional block diagram of an exemplary UE. The search control circuitry 110 receives information regarding the status of various UE operating parameters. In some examples, this information is received from an application processor of the UE. Based on the information the search control circuitry 110 provides search triggers and frequency and/or band updates to the search circuitry 150. When triggered by the search control circuitry 110, the search circuitry 150 performs a search or scan of one or more frequency sets (FS) associated with the trigger.

Figure 5:
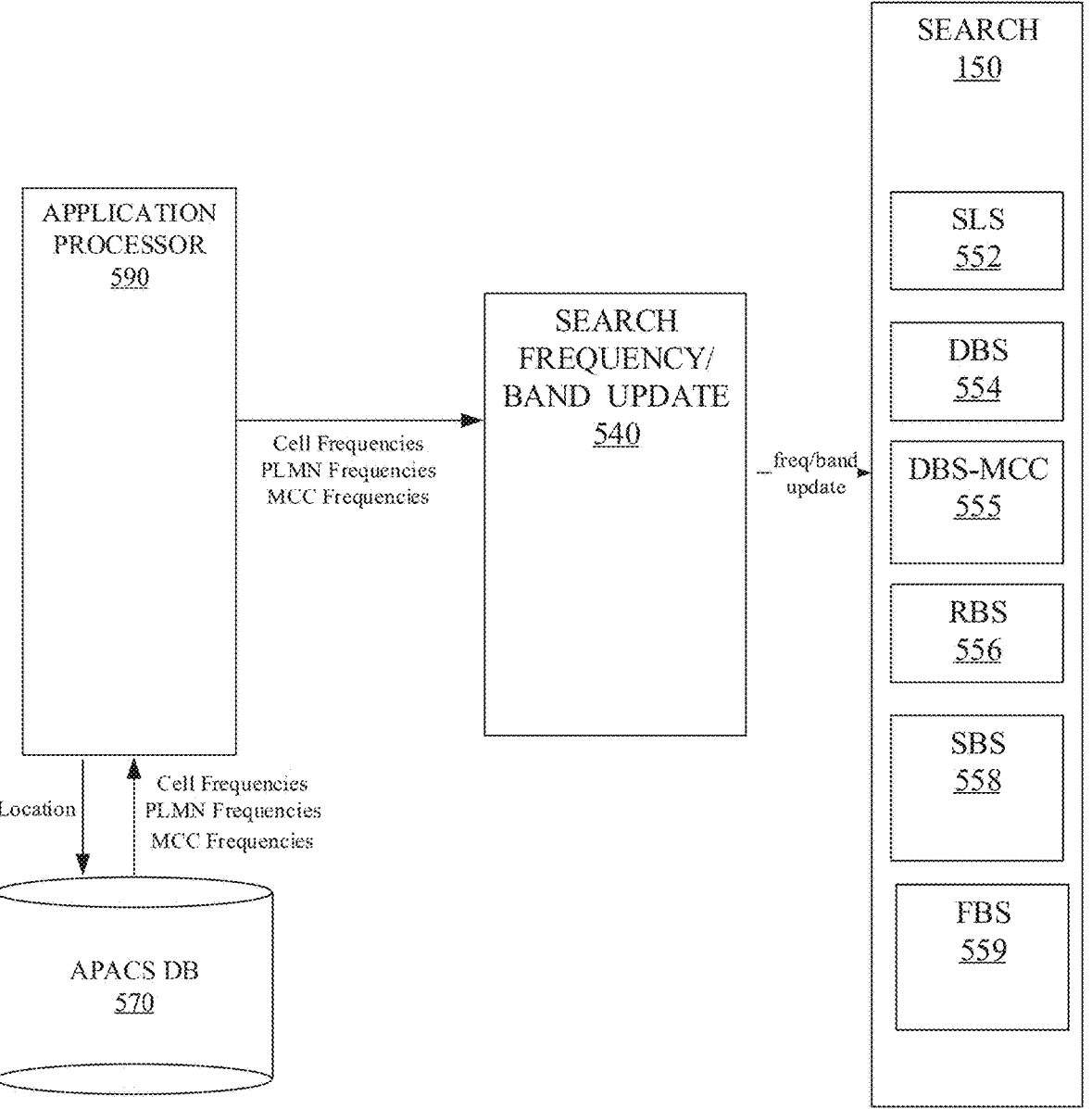
FIG. 5 is a functional block diagram of a search frequency/band update circuitry of FIG. 1, in accordance with various aspects described.

A frequency set is a set of frequencies or bands associated with a given type of cell search. A frequency set may include frequencies searched in a list mode search or a range or sub-range of a frequency band searched in a range mode search. In some aspects, as illustrated in FIG. 5, a first frequency set includes frequencies stored by the UE that would be searched by SLS. A second frequency set includes bands derived from the frequencies of the first frequency set that would be searched by DBS. A third frequency set includes bands derived from mobile country codes for countries proximate the UE's location that would be searched by DBS-MCC. A fourth frequency set includes remaining bands that are supported by the current PLMN/RAT that are not included in the first three frequency sets (e.g., frequencies that would be searched by RBS). A fifth frequency set includes bands that are associated or stored in relation to a specific band search (SBS) with which the UE is configured or preconfigured. A sixth frequency set includes bands that are searched in a full band search (FBS), which may be used when performing a manual PLMN search.

While the terms SLS, DBS, DBS-MCC, RBS, SBS, FBS, and so on may have particular definitions as terms of art, as used herein these terms may be construed more broadly. For example, the first frequency set, which is referred to herein interchangeably with SLS, may include frequencies having a highest likelihood of success based on the UE's likely location. The frequencies may include frequencies stored in a list when the UE loses coverage and/or frequencies that are associated with the UE's current cell-level location or even a broader region surrounding the UE's location. The particular frequencies searched in the SLS may be updated by the search control circuitry 110 as will be described with reference to FIG. 5. The second frequency set or DBS may include bands derived from this more broadly defined set of SLS frequencies, and so on.

Exemplary UE status information that may be used by search control circuitry 110 in controlling the search circuitry 150 includes motion status (e.g., UE static state or UE motion state) which may be determined based on sensor data (e.g., accelerometer data), screen status (e.g., locked/unlocked), UE sleep status (e.g., awake or asleep), a UE's power state (e.g., a percentage of remaining battery power or low power mode), whether a UE is proximate an international border, whether the UE has an active WiFi connection, and so on.

The search control circuitry 110 includes search pattern timers 120 and ad hoc search trigger circuitry 130 that generate scheduled search triggers and ad hoc search triggers, respectively. Frequencies associated with cells proximate a UE's location as well as frequencies associated with a wider surrounding area may be received from an application processor and used by search frequency/band update circuitry 140 to update frequencies/bands included in the frequency sets that are searched by the search circuitry 150.

Figure 2:
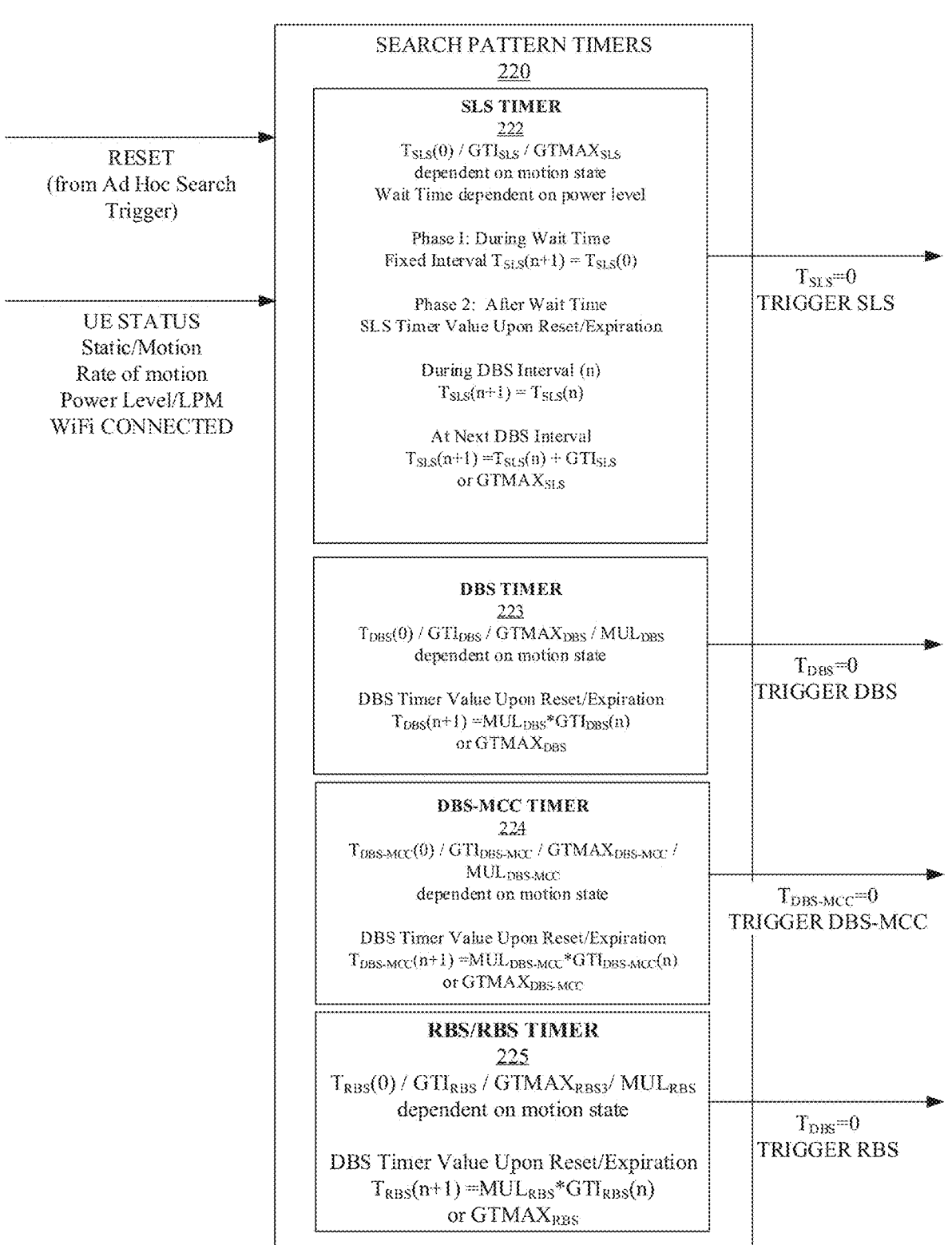
FIG. 2 is a functional block diagram of search pattern timers of FIG. 1, in accordance with various aspects described.

FIG. 2 illustrates exemplary search pattern timer algorithms that generate respective scheduled search triggers associated with respective frequency sets according to a cell search pattern. The cell search pattern is established with respect to a time at which the UE lost coverage (e.g., entered the OOC state). Each timer 222-225 is each associated with a specific frequency set (FS), where an FS may be SLS, DBS, DBS-MCC, RBS, on so on. When a timer reaches 0, a search of its associated frequency set is triggered. After triggering a search a timer is reset to a value that is determined based on its timer algorithm.

Each timer algorithm generates a search trigger for a given frequency set based on configurable pattern parameters. The pattern parameters including an initial gap time or search interval that defines the initial value of the timer ($T_{FS}(0)$), a gap time increment ($GTI_{FS}$), and a maximum gap time ($GTMAX_{FS}$). The initial gap time $T_{FS}(0)$ specifies an interval or gap between the time at which the UE loses coverage and the first search of a given FS. The gap time increment specifies an interval or gap between successive searches of a given FS and the maximum gap time increment specifies a maximum allowed interval or gap between successive searches of the given FS. Optionally, timer algorithms may generate scheduled search triggers based additionally on a configurable increment multiplier $MUL_{FS}$ that defines a scaling factor that is applied to the gap time increment after each successive search to generate increasing gap times. Once the maximum gap time is reached, the search rate for the FS is constant based on the maximum gap time.

The cell search pattern parameters are configurable by the search control circuitry (e.g., baseband processor executing a control algorithm) and different values may be configured for use when a UE is in a static state and when the UE is in a motion state. In some aspects the initial search interval and other pattern parameters are configured with smaller values when the UE is in the motion state as compared to the static state.

The SLS timer 222 has a configurable wait time that divides the SLS search pattern into a first phase and a second phase. In some examples, the wait time is 300 seconds. In some aspects the search rate of SLS during phase 1 is more aggressive (e.g., with smaller intervals between) than during phase 2. A length of the wait time or phase 1 may be configured based on a power state of the UE when the UE loses coverage. Thus, a maximum wait time may be configured when the UE has full battery remaining when the UE loses coverage and a shorter wait time may be configured when the UE has less than full battery remaining when the UE loses coverage. In the illustrated example, during phase 1, the interval between successive SLS remains constant at the initial search interval value.

Figures 3A, 3B, 3C:
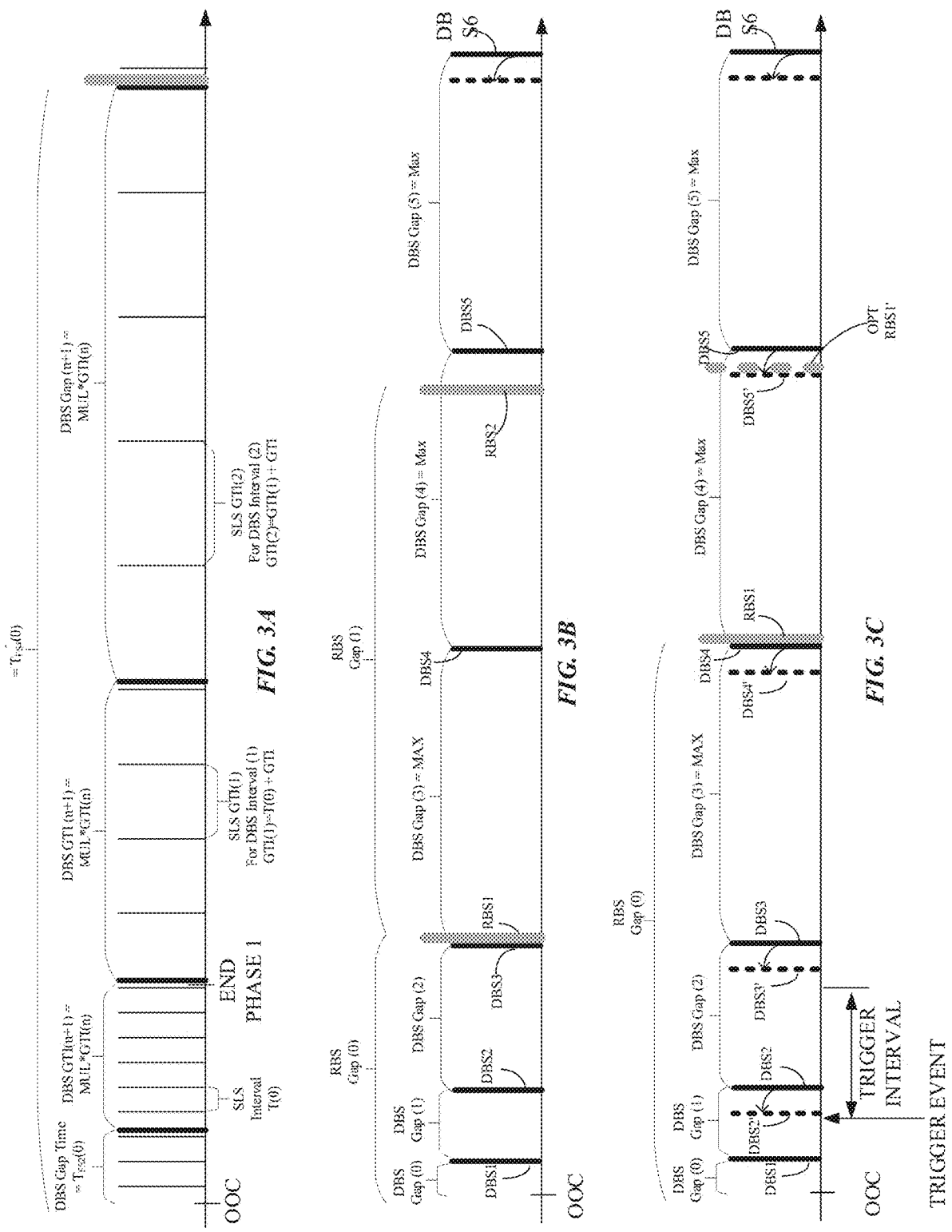
FIGS. 3A, 3B, and 3C are diagrams outlining cell search patterns and cell search pattern adjustment due to trigger events, in accordance with various aspects described.

At the beginning of phase 2, the timer algorithm for timer 222 increases the interval between successive SLS based on the gap time increment. In some examples, the timer algorithm for timer 222 again increases the interval between successive SLS increases by the gap time increment concurrently with each triggered DBS as shown in FIG. 3A. While only two phases, defined by the wait time, are disclosed in the example of FIG. 2, additional phases with unique search timing characteristics, may be defined by additional wait times or other means.

Timer algorithms for DBS, DBS-MCC, and RBS timers 223, 224, 225, respectively determine a next timer value $T_{FS}(n+1)$ based on the current gap time increment value and the increment multiplier MULES. The current gap time increment value $GTI_{FS}(n)$ is multiplied by the increment multiplier $MUL_{FS}$ to generate the next gap time increment value $GTI_{FS}(n+1)$ and the next timer value $T_{FS}(n+1)$. Once the maximum gap time is reached, the search rate will remain constant based on the maximum gap time.

FIG. 3A illustrates example search patterns for SLS, DBS, and RBS. Vertical lines having a normal weight represent SLS. Heavy vertical lines represent DBS. Heavy grey vertical lines represent RBS. It can be seen that during phase 1, SLS search instances are scheduled at a fixed SLS interval while the DBS search instances are scheduled with increasing intervals based on an increasing gap time increment (e.g., due to the effect of gap time increment multiplier (MUL) in the timer algorithm). Due to the length of the initial search interval for RBS, no RBS search instance is scheduled during phase 1.

In phase 2, DBS continues the pattern of having increasing intervals based on an increasing gap time increment. A first RBS is scheduled concurrent with fourth DBS according to an initial gap time $T_{RBS}(0)$.

At the beginning of phase 2, the gap time interval between SLS increases based on the configured gap time increment and the search rate for SLS remains constant (e.g., with constant intervals between successive searches) until the next DBS. Concurrent with each DBS, the interval between SLS increases based on the configured gap time increment up to the maximum gap time. While a specific pattern is disclosed for SLS search instances in phases 1 and 2, the timer algorithm for timer 222 may schedule SLS search instances according to other patterns based on different pattern parameter values.

FIG. 3B illustrates cell search patterns for DBS and RBS without showing SLS. FIG. 3B has a different time scale than FIG. 3A such that a longer time duration is illustrated in FIG. 3B. The increasing intervals between scheduled DBS and scheduled RBS can be seen in FIG. 3B.

Any or all of the cell search pattern parameters, including the wait time for SLS, the initial search interval, the gap time increment, the maximum gap time, and the gap time increment multiplier may be configurable and have different configurations for static vs. motion state of the UE. The motion state of the UE may be received from the application processor or determined by the baseband processor based on sensor data. In general, the cell search pattern parameters may have lower values, resulting in more frequent searches, when the UE is in the motion state. In some examples, the cell search pattern parameter values for the motion state may be half the corresponding values for the static state.

The search pattern timer algorithms may automatically adjust the cell search pattern parameters based on real-time operating conditions of the UE, such as the UE's power level when the UE loses coverage or the UE entering low power mode (LPM) while it is OOC. The wait time may be adjusted based on the power state of the UE when the UE loses coverage. For example, the wait time may be set to a maximum value when the UE has full power when the UE loses coverage and to a proportionally lower value when the UE has less than full power when the UE loses coverage. When the UE enters LPM, the gap time increment values and/or the gap time increment multiplier values of selected or all timers may be increased to reduce the frequency.

A WiFi connection may indicate that the UE is operating within a limited location range (inside a building). In recognition of this concept, the cell search parameters may be adjusted to achieve a reduced search rate when a WiFi connection is detected. For example, when a WiFi connection is detected, cell search pattern parameter values associated with the static state may be used by the timers instead of parameter values associated with the motion state. Alternatively or additionally, when a WiFi connection is detected gap time increments may be increased, such as by changing a value of the gap time increment multiplier.

In some examples, the gap time increment value for the motion state may be adjusted inversely proportionately to a change in a rate of motion of the UE, such that when the rate of motion increases, the gap time increment decreases and the search rate increases and when the rate of motion decreases, the gap time increment increases and the search rate decreases.

In this manner, when a UE loses coverage, the cell search pattern timers 220 will trigger a series of scheduled search time instances of the various frequency sets as described above. Each scheduled search time instance occurs at a predetermined time relative to at time at which the UE loses coverage. A minimum search rate for each FS may be controlled based on the value set for the maximum gap time.

Figure 4:
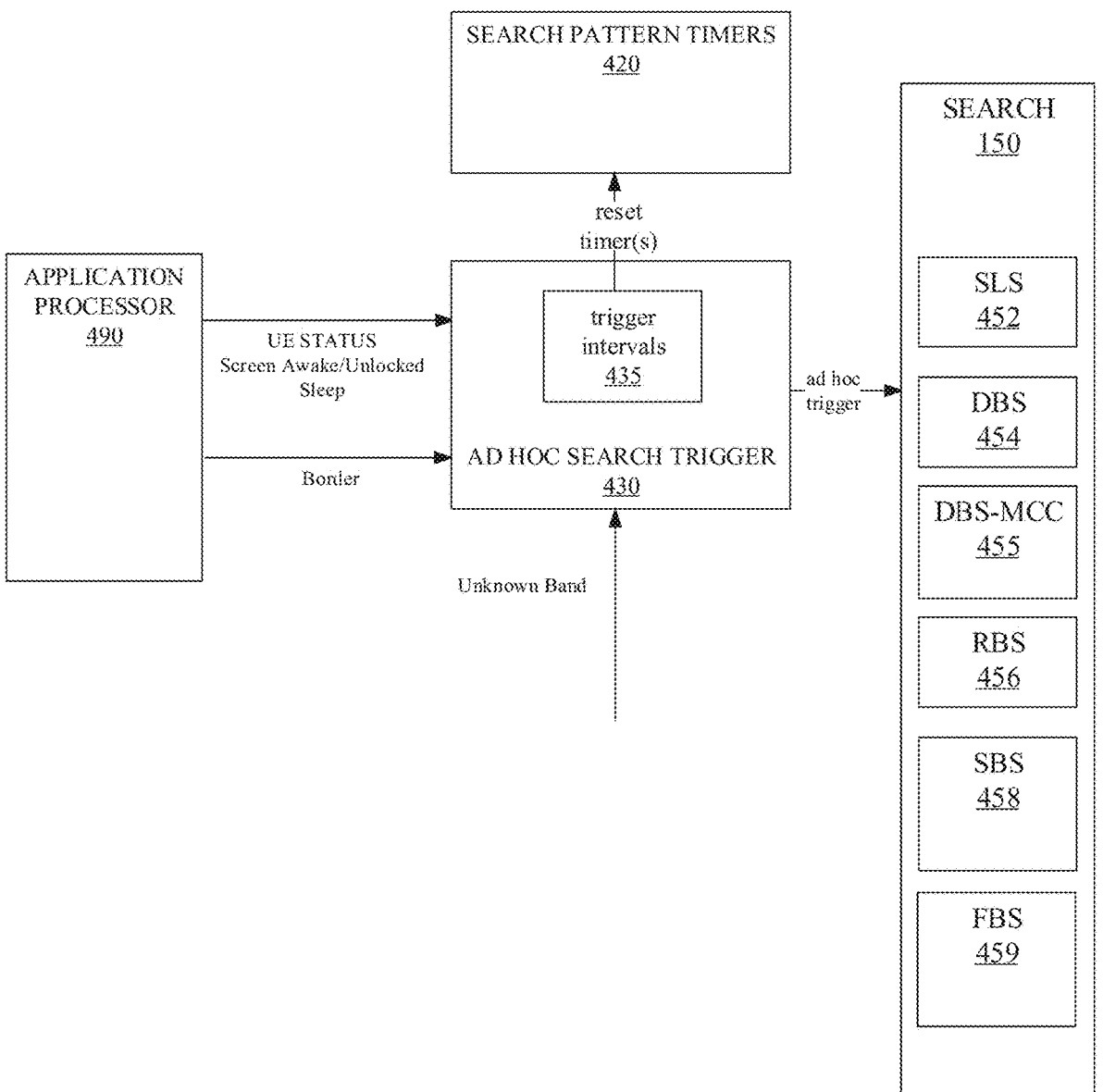
FIG. 4 is a functional block diagram of an ad hoc search trigger circuitry of FIG. 1, in accordance with various aspects described.

Real-time UE operating conditions may provide an indication that coverage is available and/or desired by a user. Thus it may be beneficial to support ad hoc triggering of cell searches based on a UE's operational status or location. FIG. 4 illustrates an example ad hoc search trigger circuitry 430 that generates ad hoc search triggers that cause immediate searches of various FS (e.g., SLS 452, DBS 454, DBS-MCC 455, RBS 456, SBS 458, FBS 459) in response to certain UE status or location information. The ad hoc search trigger circuitry 430 monitors various aspects of UE operation to detect trigger criteria. This information related to the UE operation may be received from an application processor 490.

Trigger criteria include a UE screen being unlocked, a UE transitioning to a wake state from a sleep state, or a UE approaching a border location. For example, when the UE screen is unlocked or transitions from screen asleep to screen awake a DBS may be triggered. When the UE wakes from a sleep state a DBS may be triggered. When cell signals in an unknown band are detected, an FBS may be triggered. When the ad hoc search trigger circuitry 430 determines that the UE's location is near a border, the ad hoc search trigger circuitry 430 may trigger a DBS-MCC. The application processor may alert the ad hoc search trigger circuitry 430 that the UE is near a border based on the UE's geographic location determined by the application processor. Alternatively, the baseband processor of the UE may detect signals from cells having different MCCs and deduce that the UE is proximate a border. When stored frequency information mapped to the UE's location changes (see, e.g., APACS DB of FIG. 5), an SLS or DBS may be triggered. Other criteria may be used. While each of these example ad hoc triggers causes a search of a single FS, in other examples, an ad hoc trigger may cause searches of multiple FS.

The ad hoc search trigger circuitry 430 is configured with trigger intervals 435 for each FS. The trigger interval defines a time after an ad hoc trigger during which subsequent ad hoc triggers for the same (or any) FS may not be generated. This reduces the likelihood of multiple unsuccessful searches of the same FS being performed in response to an ad hoc trigger criteria being met multiple times in a short duration or different criteria being met in close succession.

After providing an ad hoc trigger that causes a cell search of one or more frequency sets, the ad hoc search trigger circuitry 430 provides a reset signal to one or more of the search pattern timers 420. This causes the timing of scheduled search instances that will be triggered by the timer(s) to be adjusted, while maintaining the minimum search rate configured by way of the maximum gap time parameter. In some examples, only the timer associated with the FS that was searched in response to the ad hoc trigger is reset and in other examples other or all of the FS timers are reset by the ad hoc search trigger circuitry 430 after triggering an ad hoc search of any FS.

FIG. 3C illustrates one example of an interaction between the search pattern timers 420 and the ad hoc search trigger circuitry 430 for DBS and RBS. During the illustrated time period, six DBS scheduled search instances DBS1-DBS6 and a single RBS scheduled search instance RBS1 is scheduled based on the time the UE lost coverage. A subsequent RBS is scheduled that is to occur beyond the illustrated time period. It can be seen that for DBS scheduled search instances, the gap or interval between successive searches increases with an increasing increment until, after the third scheduled search instance DBS3, the maximum gap time is reached. It is noted that the SLS may also be scheduled during the time shown in FIG. 3C, but have been omitted for simplicity. The SLS pattern and its relationship to the DBS pattern is illustrated in FIG. 3A.

After an unsuccessful scheduled cell search DBS1, a trigger event occurs at an offset time prior to a second scheduled search instance DBS2. In response, the ad hoc search trigger circuitry triggers a DBS at the time indicated by the dashed vertical lines DBS2'. The ad hoc search trigger circuitry also resets the DBS timer so the timer acts as though the scheduled search instance DBS2 has been performed early. This means that subsequent scheduled search instances DBS3-DBS6 will occur at a modified (earlier) time as indicated by adjusted scheduled search instances DBS3'-DBS6'. However, the same intervals or gaps between adjusted DBS instances are maintained as originally determined by the timer. Thus, each scheduled DBS search instance occurs earlier than originally scheduled based on the offset between the ad hoc triggered DBS and the subsequent scheduled DBS search instance (e.g., a time difference between DBS2' and DBS2). This preserves the DBS search rate to be at least a minimum search rate configured by the maximum gap time. In some examples, all of the cell search pattern timers are reset in this manner, not just the timer associated with the FS that was searched in response to an ad hoc trigger.

In some examples, RBS may be performed independent of DBS. In this case, the timing of RBS1 is not affected by the ad hoc triggered DBS2'. In other examples, RBS is always performed immediately subsequent to a DBS. In this case, the RBS is not performed automatically when the RBS timer expires, but rather when the DBS timer expires the RBS timer is checked and if the RBS timer has expired the RBS is performed immediately after the DBS. In the illustrated example when DBS4' is performed, the RBS time has not yet expired and RBS1 is not performed in conjunction with DBS4'. Rather, RBS1 will be performed in conjunction with DBS5' as shown by the dashed heavy grey vertical line RBS1'.

The trigger interval is illustrated in FIG. 3C. During this interval after the trigger event, another search of the same FS(s) may not be allowed to be triggered by the ad hoc search trigger circuitry and any trigger events for DBS in this interval are ignored.

FIG. 5 illustrates an example search frequency/band update circuitry 540 that dynamically updates the frequencies and/or bands in the frequency sets that are searched during respective cell search types. In the example of FIG. 5, the frequency sets include SLS 552, DBS 554, DBS-MCC 555, RBS 556, SBS 558, and FBS 559. In other examples, different frequency sets may include different groupings of frequencies or bands adapted for different OOC scenarios.

The search frequency/band update circuitry 540 receives frequency/band information from an application processor 590. The application processor 590 fetches frequency/band information from an application processor assisted cell search (APACS) database (DB) 570 that is stored in the UE. The APACS DB 570 is global database that may be maintained and updated by a network server with new versions periodically provided to in coverage UEs. The APACS DB is populated in a crowd source manner by UEs in coverage. The APACS DB stores operating frequency information mapped to location information for in-coverage UEs. In other words, UEs report their location and operating frequency (e.g., the frequency currently in use for communication) to the network to populate the APACS DB. The APACS DB 570 aggregates and stores the crowd sourced frequency and location information on a per cell basis and on a per PLMN basis. The APACS DB 570 may also store location and/or frequency information mapped to MCCs.

For each cell, the APACS database 570 stores frequencies on a per PLMN/RAT basis (referred to as PLMN/RAT/FREQ) in the region (e.g., range of locations) associated with the cell. The search frequency/band update circuitry 540 may fetch cell level frequency information when it acquires a cell to identify frequencies that should be included in the frequency set searched in SLS 552. In some instances, the application processor 590 may query the APACS database 570 in response to acquiring a new UE location or when the UE powers up, is switched out of airplane mode, or a different SIM card is installed. The application processor 590 then may push the retrieved cell level frequency information to the search frequency/band update circuitry 540, which uses the information to update (e.g., augment or replace) the frequency set for SLS 552.

The APACS database 570 may also store comprehensive PLMN/RAT/FREQ for a larger area than a single cell, such as an entire country. When the UE connects to a PLMN, the search frequency/band update circuitry 540 may trigger the application processor 590 to fetch this comprehensive list of frequency information for the PLMN from the APACS database 570. In one example, the search frequency/band update circuitry 540 includes some or all of the frequencies in the comprehensive list in the SLS 552 to increase the likelihood of a successful search. In other examples the comprehensive set of PLMN frequencies are grouped in a separate frequency set from the SLS and this frequency set is searched using a search pattern as described for DBS and RBS.

When a UE detects that it is proximate cells in different countries (e.g., with different MCCs), the search frequency/ band update circuitry 540 may trigger the application processor 590 to fetch frequencies mapped to the proximate countries' MCCs from the APACS DB 570 and include the frequencies in the DBS-MCC frequency set.

In some examples, the application processor provides PLMN/RAT/FREQ for all PLMNS and RATs and the search frequency/band update circuitry 540 filters the information and selects frequencies associated with PLMN/RAT currently in use by the UE. In other examples, the application processor 590 performs this filtering on data retrieved from the APACS DB 570.

Figure 6A:
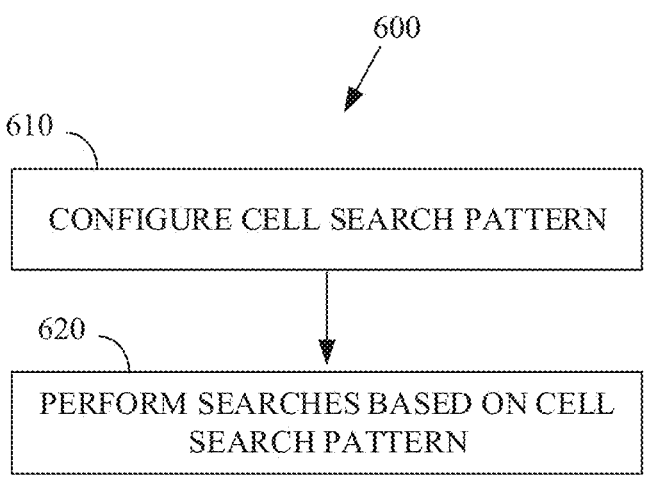
FIGS. 6A and 6B are flow diagrams outlining example methods of performing adaptive cell searches, in accordance with various aspects described.

FIG. 6A is a flow diagram outlining an example method 600 for performing a cell search while in an OOC state. The method 600 may be performed, for example, by the systems and circuitries of FIGS. 1-5, implemented in a UE. In some examples, a UE includes memory storing executable instructions for performing the method 600 and a baseband processor that is configured to execute the instructions to perform a cell search.

The method 600 includes, at 610, configuring a cell search pattern that defines a series of scheduled search instances for each of one or more frequency sets. A timing of the series of scheduled search instances is based on a time at which the UE entered OOC status. The cell search pattern is configured to cause performance of a respective minimum search rate of respective frequency sets. At 620, the method includes performing searches of the frequency sets based on the configured cell search pattern. Example cell search patterns are illustrated in FIGS. 3A-3C and example timer algorithms that implement the cell search pattern are illustrated in FIG. 2.

In some examples, the method includes configuring the cell search pattern using a cell search pattern configuration that includes respective pattern parameters for each frequency set indicating one or more of an initial gap time between scheduled search instances, a maximum gap time between scheduled search instances that is based on the minimum search rate for the frequency set, an increment of gap increase between scheduled search instances, or a multiplier to be applied to the increment for each successive scheduled search instance. Example timer algorithms that configure the cell search pattern based on these pattern parameters are illustrated in FIG. 2.

In some examples, the method includes configuring the cell search pattern based on a power state of the UE. Preconfigured or default cell search pattern parameter values may be adjusted based on real-time operating conditions of the UE, such as the UE's power level when the UE loses coverage or the UE entering low power mode (LPM) while it is OOC. A wait time parameter that defines different search phases (see, e.g., FIG. 3A) may be adjusted based on the power state of the UE when the UE loses coverage. For example, the wait time may be set to a maximum value when the UE has full power when the UE loses coverage and to a proportionally lower value when the UE has less than full power when the UE loses coverage. This maximizes an amount of time the UE performs a more aggressive cell search to regain coverage when the UE has sufficient power to do so. When the UE enters LPM, to further conserve power the gap time increment values and/or the gap time increment multiplier values of selected or all timers may be increased to reduce the frequency of cell searches.

In some examples, the method includes configuring different cell search patterns for a static UE state and a motion UE state. The motion state of the UE may be received from the application processor or determined by the baseband processor based on sensor data. In general, the cell search pattern parameter values may be lower when the UE is in the motion state, resulting in more frequent searches. In some examples, the cell search pattern parameter values for the motion state may be half the corresponding values for the static state.

In some examples, the method includes adjusting the cell search pattern in response to detecting a WiFi connection for the UE. A WiFi connection may indicate that the UE is operating within a limited location range (inside a building). In recognition of this concept, the cell search parameters may be adjusted to achieve a reduced search rate when a WiFi connection is detected. For example, when a WiFi connection is detected, cell search pattern parameter values associated with the static state may be used by the timer algorithms instead of parameter values associated with the motion state and/or gap time increments may be increased, such as by changing a value of the gap time increment multiplier.

In some examples, the method includes adjusting the cell search pattern in response to detecting that the UE is operating in LPM. The gap time increment values and/or the gap time increment multiplier values of selected or all timers may be increased to reduce the frequency.

In some examples, the method includes adjusting the cell search pattern based on a rate of motion of the UE. The gap time increment value for the motion state may be adjusted inversely proportionately to a change in a rate of motion of the UE, such that when the rate of motion increases, the gap time increment decreases and the search rate increases and when the rate of motion decreases, the gap time increment increases and the search rate decreases.

In some examples, the cell search pattern includes more than one time phase, such that during each time phase the cell search pattern schedules search instances of selected frequency sets according to a different pattern as compared to a pattern in other time phases. Respective lengths of the more than one time phase may be controlled by a configurable wait time parameter (see, e.g., FIG. 3A). The value of the wait time parameter may be adjusted based on the power state of the UE when the UE loses coverage. For example, the wait time may be set to a maximum value when the UE has full power when the UE loses coverage and to a proportionally lower value when the UE has less than full power when the UE loses coverage. This maximizes an amount of time the UE performs a more aggressive cell search to regain coverage when the UE has sufficient power to do so.

In some examples, the method includes triggering a cell search of certain frequency sets in response to a trigger event (see, e.g., FIGS. 3C and 4). In these examples, the method may include, in response to a trigger event occurring at an offset time prior to a scheduled search instance, determining whether a previous trigger event occurred within a trigger interval. The method includes, if no previous trigger event occurred, performing a search of at least one of the frequency sets associated with the trigger event and adjusting a timing of the scheduled search instances for the at least one of the frequency sets based on the offset time, while preserving an original interval between the scheduled search instances for the at least one of the frequency sets. This preserves a minimum search rate configured by the maximum gap time. The trigger event may be a screen unlock, a transition from screen sleep to screen awake, a transition from a UE sleep state to a wake state, detection of an unknown band, or detection of a proximate geographic border. Other trigger events may trigger ad hoc cell searches.

In some examples, as illustrated in FIG. 5, the method includes modifying frequencies included in respective frequency sets based on information received from an application processor (AP) assisted cell search (APACS) database that stores operating frequency information mapped to location information for in-coverage UEs.

In some examples, the method includes fetching (e.g., from a database) or receiving an indication of frequencies supported in one or more cells proximate to the UE and modifying frequencies included in one or more frequency sets based on the indication of frequencies. The method may include fetching cell level frequency information when the UE acquires a cell, moves to a new location, is switched out of airplane mode, or has a new SIM card installed. The retrieved cell level frequency information may be used to update (e.g., augment or replace) the frequency set for SLS.

In some examples, the method includes fetching or receiving an indication of frequencies supported in a larger set of cells proximate the UE, such as an entire country or region. The method may include fetching this comprehensive list of frequency information and including some or all of the frequencies in the comprehensive list in the SLS to increase the likelihood of a successful search. In other examples the comprehensive set of frequencies are grouped in a separate frequency set from the SLS and this frequency set is searched using a search pattern as described for DBS and RBS.

In some examples, the method includes fetching frequencies mapped to proximate countries' MCCs and including the frequencies in the DBS-MCC frequency set.

Figure 6B:
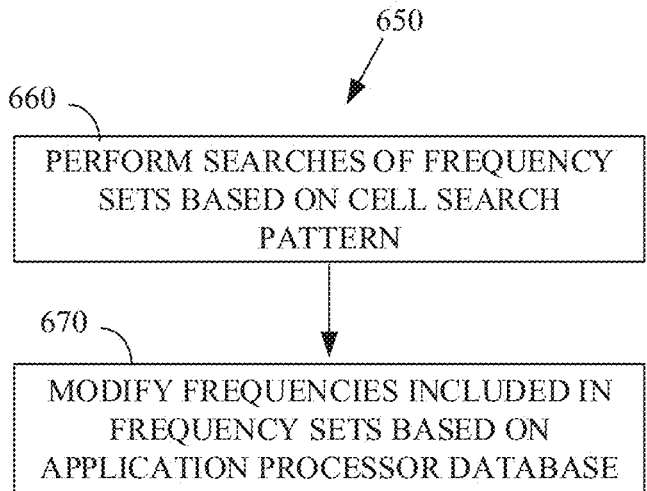

FIG. 6B is a flow diagram outlining an example method 650 for performing a cell search while in an OOC state. The method 650 may be performed, for example, by the systems and circuitries of FIGS. 1-5, implemented in a UE. In some examples, a UE includes memory storing executable instructions for performing the method 650 and a baseband processor that is configured to execute the instructions to perform a cell search.

The method includes, at 660, performing searches of one or more frequency sets based on a cell search pattern that defines a series of scheduled search instances for each of the one or more frequency sets. At 670, the method includes modifying frequencies included in respective frequency sets based on information received from an application processor database that stores operating frequency information mapped to location information for in-coverage UEs.

In some examples, as illustrated in FIG. 5, the method includes modifying frequencies included in respective frequency sets based on information received from an application processor (AP) assisted cell search (APACS) database that stores operating frequency information mapped to location information for in-coverage UEs.

In some examples, the method includes fetching (e.g., from a database) or receiving an indication of frequencies supported in one or more cells proximate to the UE and modifying frequencies included in one or more frequency sets based on the indication of frequencies. The method may include fetching cell level frequency information when the UE acquires a cell, moves to a new location, is switched out of airplane mode, or has a new SIM card installed. The retrieved cell level frequency information may be used to update (e.g., augment or replace) the frequency set for SLS.

In some examples, the method includes fetching or receiving an indication of frequencies supported in a larger set of cells proximate the UE, such as an entire country or region. The method may include fetching this comprehensive list of frequency information and including a subset of or all of the frequencies in the comprehensive list in the SLS to increase the likelihood of a successful search. In other examples the comprehensive set of frequencies are grouped in a separate frequency set from the SLS and this frequency set is searched using a search pattern as described for DBS and RBS.

In some examples, the method includes fetching frequencies mapped to proximate countries' MCCs and including the frequencies in the DBS-MCC frequency set.

It can be seen from the foregoing description that providing cell search patterns that are configurable with respect to a time at which a UE loses coverage while also supporting ad hoc triggering of cell searches and dynamic updating of frequencies/bands that are searched may improve the likelihood that a UE may regain coverage in a power efficient manner.

Above are several descriptions of flow diagrams outlining example methods and exchanges of messages. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of an entity is to be construed broadly as encompassing any manner or technique for generating a data sequence or signal that communicates the entity to another component.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. The term derive should be construed to encompass computing or calculating the entity or value of the entity based on other quantities or entities. The term derive should be construed to encompass any manner of deducing or identifying an entity or value of the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

Figure 7:
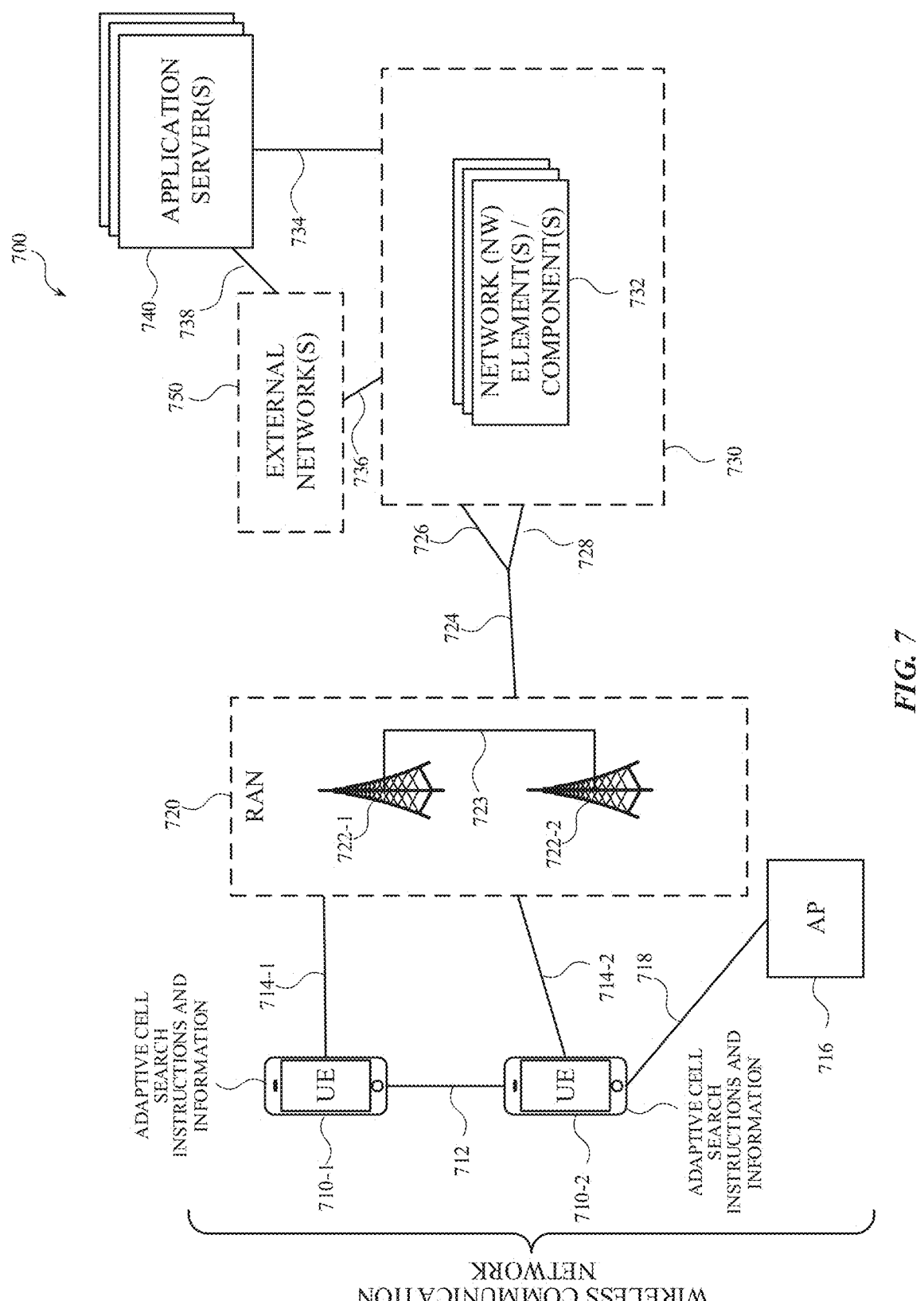
FIG. 7 is a functional block diagram of a wireless communication network, in accordance with various aspects described.

FIG. 7 is an example network 700 according to one or more implementations described herein. Example network 700 may include UEs 710-1, 710-2, etc. (referred to collectively as "UEs 710" and individually as "UE 710"), a radio access network (RAN) 720, a core network (CN) 730, application servers 740, and external networks 750.

The systems and devices of example network 700 may operate in accordance with one or more communication standards, such as 2nd generation (2G), 3rd generation (3G), 4th generation (4G) (e.g., long-term evolution (LTE)), and/ or 5th generation (5G) (e.g., new radio (NR)) communication standards of the 3rd generation partnership project (3GPP). Additionally, or alternatively, one or more of the systems and devices of example network 700 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 710 may include smartphones (e.g., handheld touchscreen mobile computing devices connectable to one or more wireless communication networks). Additionally, or alternatively, UEs 710 may include other types of mobile or non-mobile computing devices capable of wireless communications, such as personal data assistants (PDAs), pagers, laptop computers, desktop computers, wireless handsets, watches etc. In some implementations, UEs 710 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 710 may use one or more wireless channels 712 to communicate with one another. UEs 710 may communicate and establish a connection with (e.g., be communicatively coupled) with RAN 720, which may involve one or more wireless channels 714-1 and 714-2, each of which may comprise a physical communications interface/layer.

As described herein, UEs 710-1, 710-2 may store adaptive cell search instructions and information including configurations and/or instructions for performing adaptive cell search techniques disclosed with reference to FIGS. 1-6B.

As shown, UE 710 may also, or alternatively, connect to access point (AP) 716 via connection interface 718, which may include an air interface enabling UE 710 to communicatively couple with AP 716. AP 716 may comprise a wireless local area network (WLAN), WLAN node, WLAN termination point, etc. The connection 718 may comprise a local wireless connection, such as a connection consistent with any IEEE 702.11 protocol, and AP 716 may comprise a wireless fidelity (Wi-Fi®) router or other AP. While not explicitly depicted in FIG. 7, AP 716 may be connected to another network (e.g., the Internet) without connecting to RAN 720 or CN 730.

RAN 720 may include one or more RAN nodes 722-1 and 722-2 (referred to collectively as RAN nodes 722, and individually as RAN node 722) that enable channels 714-1 and 714-2 to be established between UEs 710 and RAN 720. RAN nodes 722 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 722 may include a roadside unit (RSU), a transmission reception point (TRxP or TRP), and one or more other types of ground stations (e.g., terrestrial access points). In some scenarios, RAN node 722 may be a dedicated physical device, such as a macrocell base station, and/or a low power (LP) base station for providing femtocells, picocells or the like having smaller coverage areas, smaller user capacity, or higher bandwidth compared to macrocells. Additionally, or alternatively, one or more of RAN nodes 722 can be next generation eNBs (i.e., gNBs) that can provide evolved universal terrestrial radio access (E-UTRA) user plane and control plane protocol terminations 726, 728 toward UEs 710, and that can be connected to a 5G core network (5GC) 730 via an NG interface 724.

The RAN nodes 722 may be configured to communicate with one another via interface 723. In implementations where the system is an LTE system, interface 723 may be an X2 interface. In NR systems, interface 723 may be an Xn interface. The X2 interface may be defined between two or more RAN nodes 722 (e.g., two or more eNBs/gNBs or a combination thereof) that connect to evolved packet core (EPC) or CN 730, or between two eNBs connecting to an EPC.

As shown, RAN 720 may be connected (e.g., communicatively coupled) to CN 730. CN 730 may comprise a plurality of network elements 732, which are configured to offer various data and telecommunications services to customers/subscribers (e.g., users of UEs 710) who are connected to the CN 730 via the RAN 720. In some implementations, CN 730 may include an evolved packet core (EPC), a 5G CN, and/or one or more additional or alternative types of CNs. The components of the CN 730 may be implemented in one physical node or separate physical nodes including components to read and execute instructions from a machine-readable or computer-readable medium (e.g., a non-transitory machine-readable storage medium).

Figure 8:
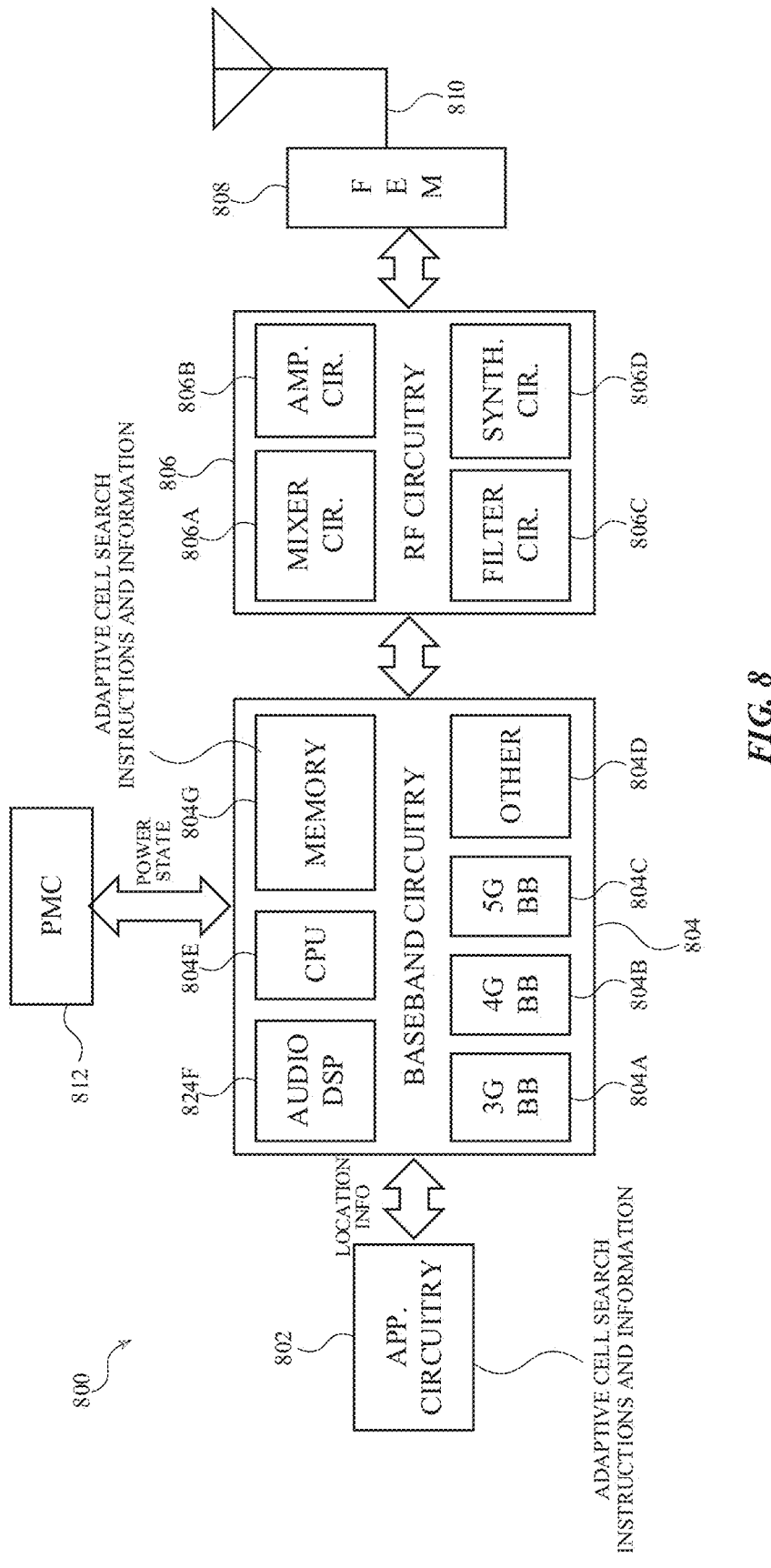
FIG. 8 illustrates a simplified block diagram of a network device, in accordance with various aspects described.

FIG. 8 is a diagram of an example of components of a network device (e.g., a user equipment (UE) configured to perform adaptive cell searching as disclosed in FIGS. 1-6B) according to one or more implementations described herein. In some implementations, the device 800 can include application circuitry 802, baseband circuitry 804, RF circuitry 806, front-end module (FEM) circuitry 808, one or more antennas 810, and power management circuitry (PMC) 812 coupled together at least as shown. The components of the illustrated device 800 can be included in a UE or a RAN node. In some implementations, the device 800 can include fewer elements (e.g., a RAN node may not utilize application circuitry 802, and instead include a processor/controller to process IP data received from a CN or an Evolved Packet Core (EPC)). In some implementations, the device 800 can include additional elements such as, for example, memory/storage, display, camera, sensor (including one or more temperature sensors, such as a single temperature sensor, a plurality of temperature sensors at different locations in device 800, etc.), or input/output (I/O) interface. In other implementations, the components described below can be included in more than one device (e.g., said circuitries can be separately included in more than one device for Cloud-RAN (C-RAN) implementations).

The application circuitry 802 can include one or more application processors. For example, the application circuitry 802 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 800. In some implementations, processors of application circuitry 802 can process IP data packets received from an EPC. In some implementations, processors of the application circuitry 802 store adaptive cell search instructions and information that enable the application circuitry 802 to provide location information, frequency information, UE operating parameters, and so that support adaptive cell searches as disclosed in FIGS. 1-6B.

The baseband circuitry 804 can include circuitry such as, but not limited to, one or more single-core or multi-core processors. The baseband circuitry 804 can include one or more baseband processors or control logic to process baseband signals received from a receive signal path of the RF circuitry 806 and to generate baseband signals for a transmit signal path of the RF circuitry 806. Baseband circuitry 804 can interface with the application circuitry 802 for generation and processing of the baseband signals and for controlling operations of the RF circuitry 806. For example, in some implementations, the baseband circuitry 804 can include a 3G baseband processor 804A, a 4G baseband processor 804B, a 5G baseband processor 804C, or other baseband processor(s) 804D for other existing generations, generations in development or to be developed in the future (e.g., 5G, 6G, etc.). The baseband circuitry 804 (e.g., one or more of baseband processors 804A-D) can handle various radio control functions that enable communication with one or more radio networks via the RF circuitry 806. In other implementations, some or all of the functionality of baseband processors 804A-D can be included in modules stored in the memory 804G and executed via a Central Processing Unit (CPU) 804E. In some implementations, the baseband circuitry 804 can include one or more audio digital signal processor(s) (DSP) 804F.

In some implementations, memory 804G may receive and/or store adaptive cell search instructions that may be executed by the baseband processors 804A-D to perform adaptive cell searching as disclosed with reference to FIGS. 1-6B.

RF circuitry 806 can enable communication with wireless networks using modulated electromagnetic radiation through a non-solid medium. In various implementations, the RF circuitry 806 can include switches, filters, amplifiers, etc. to facilitate the communication with the wireless network. RF circuitry 806 can include a receive signal path which can include circuitry to down-convert RF signals received from the FEM circuitry 808 and provide baseband signals to the baseband circuitry 804. RF circuitry 806 can also include a transmit signal path which can include circuitry to up-convert baseband signals provided by the baseband circuitry 804 and provide RF output signals to the FEM circuitry 808 for transmission.

In some implementations, the receive signal path of the RF circuitry 806 can include mixer circuitry 806A, amplifier circuitry 806B and filter circuitry 806C. In some implementations, the transmit signal path of the RF circuitry 806 can include filter circuitry 806C and mixer circuitry 806A. RF circuitry 806 can also include synthesizer circuitry 806D for synthesizing a frequency for use by the mixer circuitry 806A of the receive signal path and the transmit signal path.

Examples herein can include subject matter such as a method, means for performing acts or blocks of the method, at least one machine-readable medium including executable instructions that, when performed by a machine or circuitry (e.g., a processor (e.g., processor, etc.) with memory, an application-specific integrated circuit (ASIC), a field programmable gate array (FPGA), or the like) cause the machine to perform acts of the method or of an apparatus or system for adaptive cell searching according to implementations and examples described.

EXAMPLES

Example 1 is a UE including a memory and a baseband processor configured to, when executing instructions stored in the memory, in response to entering an out of coverage (OOC) status, cause the UE to configure a cell search pattern that defines a series of scheduled search instances for each of one or more frequency sets, wherein a timing of the series of scheduled search instances is based on a time at which the UE entered OOC status, further wherein the cell search pattern is configured to cause performance of a respective minimum search rate of respective frequency sets; and perform searches of the frequency sets based on the configured cell search pattern.

Example 2 includes the subject matter of example 1, including or omitting optional elements, wherein a cell search pattern configuration includes respective pattern parameters for each frequency set indicating one or more of an initial gap time between scheduled search instances, a maximum gap time between scheduled search instances that is based on the minimum search rate of the frequency set, an increment of gap increase between scheduled search instances, or a multiplier to be applied to the increment for each successive scheduled search instance.

Example 3 includes the subject matter of any one or more of examples 1-2, including or omitting optional elements, wherein the baseband processor is configured to, when executing instructions stored in the memory, configure the cell search pattern based on a power state of the UE.

Example 4 includes the subject matter of any one or more of examples 1-3, including or omitting optional elements, wherein the baseband processor is configured to, when executing instructions stored in the memory, configure a different cell search pattern for a static UE state and a motion UE state.

Example 5 includes the subject matter of any one or more of examples 1-4, including or omitting optional elements, wherein the baseband processor is configured to adjust the cell search pattern in response to detecting a WiFi connection for the UE, detecting that the UE is operating in low power mode, or detecting that a rate of motion of the UE has increased.

Example 6 includes the subject matter of any one or more of examples 1-5, including or omitting optional elements, wherein the cell search pattern includes more than one time phase, wherein during each time phase the cell search pattern schedules search instances of selected frequency sets according to a different pattern as compared to a pattern in other time phases, further wherein respective lengths of the more than one time phase are controlled by a configurable wait time.

Example 7 includes the subject matter of any one or more of examples 1-6, including or omitting optional elements, wherein the baseband processor is configured to cause the UE to, in response to a trigger event occurring at an offset time prior to a scheduled search instance, determine whether a previous trigger event occurred within a trigger interval and, if not, perform a search of at least one of the frequency sets associated with the trigger event; and adjust a timing of the scheduled search instances for the at least one of the frequency sets based on the offset time, while preserving an original interval between the scheduled search instances for the at least one of the frequency sets.

Example 8 includes the subject matter of any one or more of examples 1-7, including or omitting optional elements, wherein the trigger event comprises a screen unlock, a transition from screen sleep to screen awake, a transition from a UE sleep state to a wake state, detection of an unknown band, or detection of a proximate geographic border.

Example 9 includes the subject matter of any one or more of examples 1-8, including or omitting optional elements, wherein the baseband processor is configured to modify frequencies included in respective frequency sets based on information received from an application processor database that stores operating frequency information mapped to location information for in-coverage UEs.

Example 10 includes the subject matter of any one or more of examples 1-9, including or omitting optional elements, wherein the baseband processor is configured to, when executing instructions stored in the memory, cause the UE to receive an indication of frequencies supported in one or more cells proximate to the UE or frequencies supported in a larger set of cells proximate the UE; and modify frequencies included in one or more frequency sets based on the indication of frequencies.

Example 11 is a method for a user equipment (UE) including determining that the UE has entered an out of coverage (OOC) status; in response, configuring a cell search pattern that defines a series of scheduled search instances for each of one or more frequency sets, wherein a timing of the series of scheduled search instances is based on a time at which the UE entered OOC status, further wherein the cell search pattern is configured to cause performance of a respective minimum search rate of respective frequency sets; and searching the frequency sets based on the configured cell search pattern.

Example 12 includes the subject matter of example 11, including or omitting optional elements, wherein a cell search pattern configuration includes respective pattern parameters for each frequency set indicating one or more of an initial gap time between scheduled search instances, a maximum gap time between scheduled search instances that is based on the minimum search rate of the frequency set, an increment of gap increase between scheduled search instances, or a multiplier to be applied to the increment for each successive scheduled search instance.

Example 13 includes the subject matter of any one or more of examples 11-12, including or omitting optional elements, including configuring the cell search pattern based on a power state of the UE.

Example 14 includes the subject matter of any one or more of examples 11-13, including or omitting optional elements, including configuring a different cell search pattern for a static UE state and a motion UE state.

Example 15 includes the subject matter of any one or more of examples 11-14, including or omitting optional elements, including adjusting the cell search pattern in response to detecting a WiFi connection for the UE, detecting that the UE is operating in low power mode, or detecting that a rate of motion of the UE has increased.

Example 16 includes the subject matter of any one or more of examples 11-52, including or omitting optional elements, wherein the cell search pattern includes more than one time phase, wherein during each time phase the cell search pattern schedules search instances of selected frequency sets according to a different pattern as compared to a pattern in other time phases, wherein the method comprises controlling respective lengths of the more than one time phase by configuring a wait time associated with the cell search pattern.

Example 17 includes the subject matter of any one or more of examples 11-16, including or omitting optional elements, including, in response to a trigger event occurring at an offset time prior to a scheduled search instance, determining whether a previous trigger event occurred within a trigger interval and, if not, performing a search of at least one of the frequency sets associated with the trigger event; and adjusting a timing of the scheduled search instances for the at least one of the frequency sets based on the offset time, while preserving an original interval between the scheduled search instances for the at least one of the frequency sets.

Example 18 includes the subject matter of any one or more of examples 11-17, including or omitting optional elements, wherein the trigger event comprises a screen unlock, a transition from screen sleep to screen awake, a transition from a UE sleep state to a wake state, detection of an unknown band, or detection of a proximate geographic border.

Example 19 includes the subject matter of any one or more of examples 11-18, including or omitting optional elements, including modifying frequencies included in respective frequency sets based on information received from an application processor database that stores operating frequency information mapped to location information for in-coverage UEs.

Example 20 includes the subject matter of any one or more of examples 11-19, including or omitting optional elements, including receiving an indication of frequencies supported in one or more cells proximate to the UE or frequencies supported in a larger set of cells proximate the UE; and modifying frequencies included in one or more frequency sets based on the indication of frequencies.

Example 21 is a user equipment (UE) including a memory and a baseband processor configured to, when executing instructions stored in the memory, in response to entering an out of coverage (OOC) status, cause the UE to perform searches of one or more frequency sets based on a cell search pattern that defines a series of scheduled search instances for each of the one or more frequency sets; and modify frequencies included in respective frequency sets based on information received from an application processor database that stores operating frequency information mapped to location information for in-coverage UEs.

Example 22 includes the subject matter of any example 21, including or omitting optional elements, wherein the baseband processor is configured to, when executing instructions stored in the memory, cause the UE to receive indication of a set of frequencies supported in one or more cells proximate to the UE or frequencies supported in a larger set of cells proximate the UE; and modify the frequencies included in at least one of the one or more frequency sets based on the set of frequencies.

Example 23 includes the subject matter of any one or more of examples 21-22, including or omitting optional elements, wherein the baseband processor is configured to, when executing instructions stored in the memory, cause the UE to include a subset of the set of frequencies in successive searches of at least one of the one or more frequency sets.

Example 24 includes the subject matter of any one or more of examples 21-23, including or omitting optional elements, wherein the baseband processor is configured to, when executing instructions stored in the memory, cause the UE to fetch, from the application processor database, cell level frequency information when the UE acquires a new cell, is switched out of airplane mode, or connects with a different SIM card; and modify the frequencies included at least on of the one or more frequency sets based on the fetched cell level frequency information.

Example 25 includes the subject matter of any one or more of examples 21-24, including or omitting optional elements, wherein the baseband processor is configured to, when executing instructions stored in the memory, cause the UE to fetch, from the application processor database, frequencies mapped to mobile country codes of countries proximate the UE; and modify the frequencies included at least on of the one or more frequency sets based on the fetched frequencies.

Example 26 is a processor configured to perform functions or operations of any of examples 1-25.

Example 27 is an apparatus including the memory and one or more processors of any of examples 1-10 and 21-25.

Example 28 is a method for a user equipment including performing functions or operations performed by the one or more processors of any of examples 1-10 and 21-25.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. In some embodiments, the methods illustrated above may be implemented in a computer readable medium using instructions stored in a memory. Many other embodiments and variations are possible within the scope of the claimed disclosure.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE) comprising a memory and a baseband processor configured to, when executing instructions stored in the memory, in response to entering out of coverage (OOC) status, cause the UE to configure a cell search pattern that defines a series of scheduled search instances for at least one frequency set, wherein a timing of the series of scheduled search instances is based on a time at which the UE entered OOC status, further wherein the cell search pattern is configured to cause performance of a minimum search rate of the frequency set, wherein the cell search pattern includes more than one time phase, wherein during each time phase the cell search pattern includes search instances of the frequency set according to a different pattern as compared to a pattern in other time phases, further wherein respective lengths of the more than one time phase are based on a configurable wait time; and perform a search of the frequency set based on the configured cell search pattern.

2. The UE of claim 1, wherein a cell search pattern configuration includes respective pattern parameters for the frequency set indicating one or more of an initial gap time between scheduled search instances, a maximum gap time between scheduled search instances that is based on the minimum search rate of the frequency set, an increment of gap increase between scheduled search instances, or a multiplier to be applied to the increment for each successive scheduled search instance.

3. The UE of claim 1, wherein the baseband processor is configured to, when executing instructions stored in the memory, configure the cell search pattern based on a power state of the UE.

4. The UE of claim 1, wherein the baseband processor is configured to, when executing instructions stored in the memory, configure a different cell search pattern for a static UE state and a motion UE state.

5. The UE of claim 1, wherein the baseband processor is configured to adjust the cell search pattern in response to detecting a WiFi connection for the UE, detecting that the UE is operating in low power mode, or detecting that a rate of motion of the UE has increased.

6. The UE of claim 1, wherein the baseband processor is configured to cause the UE to, in response to a trigger event associated with the frequency set occurring at an offset time prior to a scheduled search instance, determine whether a previous trigger event occurred within a trigger interval and, if not, perform a search of the frequency set; and adjust a timing of the scheduled search instances for the frequency set based on the offset time, while preserving an original interval between scheduled search instances for another frequency set.

7. The UE of claim 6, wherein the trigger event comprises a screen unlock, a transition from screen sleep to screen awake, a transition from a UE sleep state to a wake state, detection of an unknown band, or detection of a proximate geographic border.

8. The UE of claim 1, wherein the baseband processor is configured to modify frequencies included in the frequency set based on information received from an application processor database that stores operating frequency information mapped to location information for in-coverage UEs.

9. The UE of claim 1, wherein the baseband processor is configured to, when executing instructions stored in the memory, cause the UE to receive an indication of frequencies supported in one or more cells proximate to the UE or frequencies supported in a larger set of cells proximate to the UE; and modify frequencies included in the frequency set based on the indication of frequencies.

10. A method for a user equipment (UE) comprising:

determining that the UE has entered out of coverage (OOC) status;

in response, configuring a cell search pattern that defines a series of scheduled search instances for at least one frequency set, wherein a timing of the series of scheduled search instances is based on a time at which the UE entered OOC status, further wherein the cell search pattern is configured to cause performance of a minimum search rate of the frequency set;

in response to a trigger event associated with the frequency set occurring at an offset time prior to a scheduled search instance, determining whether a previous trigger event occurred within a trigger interval and, if not, performing a search of the frequency set; and adjusting a timing of the scheduled search instances for the frequency set based on the offset time, while preserving an original interval between scheduled search instances for another frequency set; and searching the frequency set and the other frequency set based on the configured cell search pattern and the adjusted timing of the scheduled search instances.

11. The method of claim 10, wherein a cell search pattern configuration includes respective pattern parameters for the frequency set indicating one or more of an initial gap time between scheduled search instances, a maximum gap time between scheduled search instances that is based on the minimum search rate of the frequency set, an increment of gap increase between scheduled search instances, or a multiplier to be applied to the increment for each successive scheduled search instance.

12. The method of claim 10, comprising configuring the cell search pattern based on a power state of the UE.

13. The method of claim 10, comprising configuring a different cell search pattern for a static UE state and a motion UE state.

14. The method of claim 10, comprising adjusting the cell search pattern in response to detecting a WiFi connection for the UE, detecting that the UE is operating in low power mode, or detecting that a rate of motion of the UE has increased.

15. The method of claim 10, wherein the cell search pattern includes more than one time phase, wherein during each time phase the cell search pattern schedules search instances of the frequency set according to a different pattern as compared to a pattern in other time phases, wherein the method comprises controlling respective lengths of the more than one time phase by configuring a wait time associated with the cell search pattern.

16. The method of claim 10, wherein the trigger event comprises a screen unlock, a transition from screen sleep to screen awake, a transition from a UE sleep state to a wake state, detection of an unknown band, or detection of a proximate geographic border.

17. The method of claim 10, comprising modifying frequencies included in the frequency set based on information received from an application processor database that stores operating frequency information mapped to location information for in-coverage UEs.

18. The method of claim 10, comprising receiving an indication of frequencies supported in one or more cells proximate to the UE or frequencies supported in a larger set of cells proximate to the UE; and modifying frequencies included in the frequency set based on the indication of frequencies.

19. A user equipment (UE) comprising a memory and a baseband processor configured to, when executing instructions stored in the memory, in response to entering out of coverage (OOC) status, cause the UE to perform searches of at least one frequency set based on a cell search pattern that defines a series of scheduled search instances for the frequency set; and modify frequencies included in the frequency set based on information received from an application processor database that stores operating frequency information mapped to location information for in-coverage UEs.

20. The UE of claim 19, wherein the baseband processor is configured to, when executing instructions stored in the memory, cause the UE to receive indication of a set of frequencies supported in one or more cells proximate to the UE or frequencies supported in a larger set of cells proximate to the UE; and modify the frequencies included in the frequency set based on the set of frequencies.

21. The UE of claim 20, wherein the baseband processor is configured to, when executing instructions stored in the memory, cause the UE to include a subset of the set of frequencies in successive searches of the frequency set.

22. The UE of claim 19, wherein the baseband processor is configured to, when executing instructions stored in the memory, cause the UE to fetch, from the application processor database, cell level frequency information when the UE acquires a new cell, is switched out of airplane mode, or connects with a different SIM card; and modify the frequencies included in the frequency set on the fetched cell level frequency information.

23. The UE of claim 19, wherein the baseband processor is configured to, when executing instructions stored in the memory, cause the UE to fetch, from the application processor database, frequencies mapped to mobile country codes of countries proximate the UE; and modify the frequencies included in the frequency set based on the fetched frequencies.

* * * * *